United States Patent [19]
Besombes

[11] Patent Number: 5,160,117
[45] Date of Patent: Nov. 3, 1992

[54] BOTTOM-OF-VAT VALVE

[75] Inventor: Alain Besombes, Montigny les Bretonneux, France

[73] Assignee: Alsthom Fluides Sapag, France

[21] Appl. No.: 748,608

[22] Filed: Aug. 22, 1991

[30] Foreign Application Priority Data

Aug. 22, 1990 [FR] France .................. 90 10559

[51] Int. Cl.[5] .............................................. F16K 7/12
[52] U.S. Cl. ...................................... 251/144; 251/331
[58] Field of Search ............................. 251/144, 331

[56] References Cited

U.S. PATENT DOCUMENTS

| | | | |
|---|---|---|---|
| 3,399,695 | 9/1968 | Stehlin | 137/551 |
| 3,918,678 | 11/1975 | Rechtsteiner et al. | 251/144 |
| 4,653,526 | 3/1987 | Hoiss | 137/240 |
| 4,836,236 | 6/1989 | Ladisch | 251/331 X |

FOREIGN PATENT DOCUMENTS

| | | |
|---|---|---|
| 3017085 | of 1981 | Fed. Rep. of Germany . |
| 1240858 | of 1960 | France . |
| 2442388 | of 1981 | France . |
| 2523720 | of 1983 | France . |

*Primary Examiner*—Martin P. Schwadron
*Assistant Examiner*—Kevin L. Lee
*Attorney, Agent, or Firm*—Sughrue, Mion, Zinn, Macpeak & Seas

[57] ABSTRACT

The body (1) of a valve of the invention is welded in the bottom vat (2) in which it constitutes a controlled orifice (5), which orifice is closable by means of a resilient membrane (3) driven by means of a control wheel (11). A complementary orifice (6) is provided at the lowest point of the internal cavity (8) in the valve body to enable the cavity (8) to be emptied completely under gravity. A duct (7) separate from the complementary orifice and open to an internal cavity enables the cavity (8) to be sterilized continuously. The invention is particularly applicable to the food industry.

3 Claims, 2 Drawing Sheets

BOTTOM-OF-VAT VALVE

In the food, pharmaceutical, and cosmetics industries, installations include vats in which various substances are mixed together or manufactured. To empty the contents from such vats, their bottoms are fitted with valves referred to herein as "bottom-of-vat valves".

When the vat is emptied, it is cleaned and very often it is sterilized, as is the bottom-of-vat valve, either by means of an acid or a base, or else by means of steam (in the range 121° C. to 145° C.). In such cases, the valve includes two ports: an inlet port and outlet port. To be able to perform certain methods, it is an absolute requirement that the emptying circuit is sterile when the substance is emptied from the vat: under such circumstances, the valve includes a third port which is a steam inlet port.

When closed, the valve must naturally be fluid-tight, however it must also retain its sterility to avoid contaminating the contents of the vat. It must also be capable of guaranteeing that the retention volume in the bottom of the vat is minimal so as to avoid poor mixing of the substances.

An object of the invention is to solve the problem of bottom-of-vat valves that are required to be sterile and to ensure that the retention volume inside the vat is minimal.

The bottom-of-vat valves presently in use are:
either valves having a non-return member opening out either to the inside of the valve or else to the outside of the valve, i.e. into the vat;
or steel ball valves;
or butterfly valves.

These prior valves suffer, in particular, from the drawback of including components that constitute "bacteria traps" such as packing, grooves in gaskets, mechanisms, and retention zones. To keep them sterile, it is necessary to maintain a "sterile barrier" which requires energy to be expended.

A particular object of the present invention is to provide a bottom-of-vat valve which is free or nearly free of any internal shape or component that could constitute a bacteria trap, which is easily sterilized, which is easy to repair in the event of damage, but which nevertheless has a manufacturing cost that is moderate.

To this end, the present invention provides a valve disposed beneath a vat, the valve forming an internal cavity which communicates with the vat via a controlled orifice, and the valve being characterized by the fact that it includes a deformable membrane whose moving active region is suitable for closing said orifice.

The wall of said internal cavity is pierced by a complementary orifice which is preferably located at the bottom of said cavity when said controlled orifice is placed at the top thereof.

An implementation of the present invention is described below with reference to the accompanying diagrammatic figures, it being understood that the items and dispositions mentioned and shown are given purely by way of non-limiting example. When the same item is shown in two or more of the figures, it is designated therein by the same reference symbol.

Figure 1:
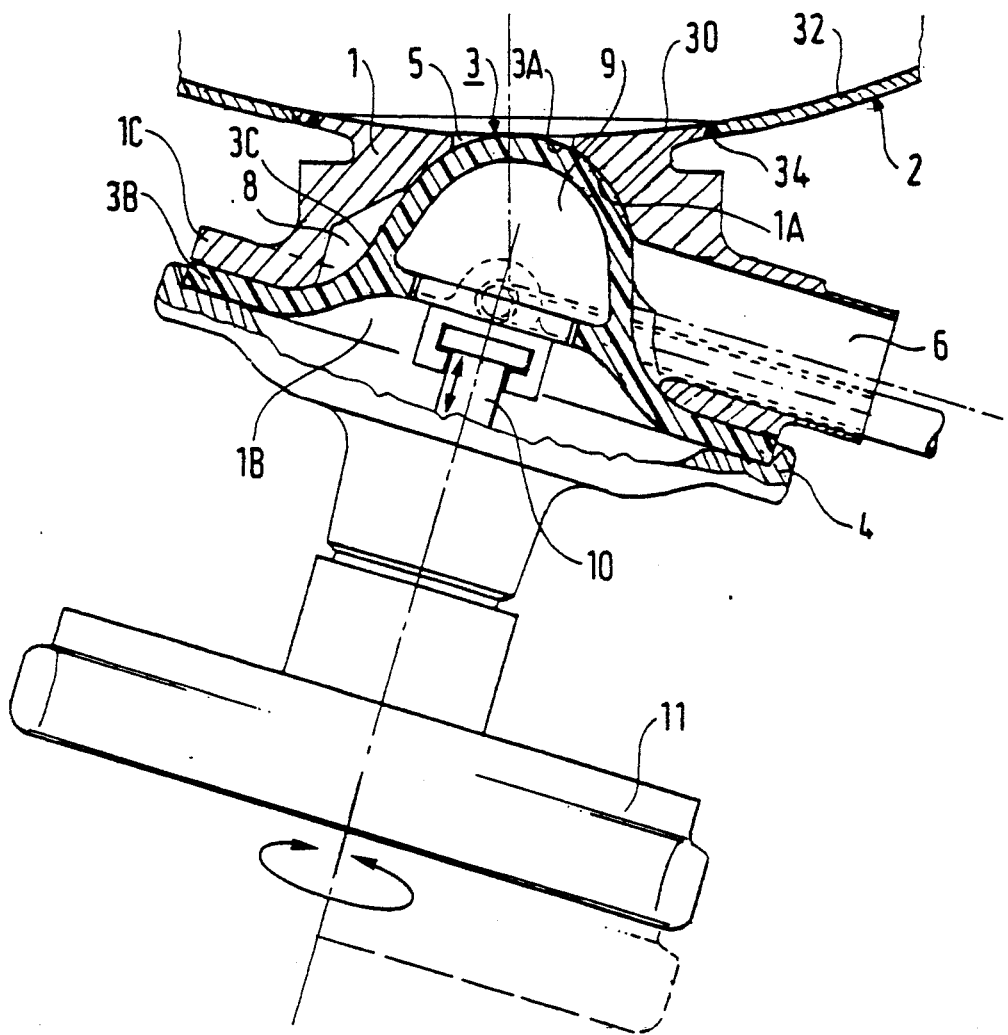
FIG. 1 is an axial section view through a first valve of the present invention.
Figure 2:
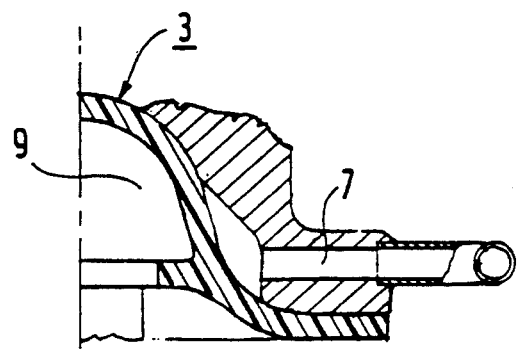
FIG. 2 is a fragmentary view of the valve in axial section on a plane perpendicular to the plane of FIG. 1.

The description begins in general terms with various advantageous dispositions adopted in these valves.

The valve includes the following items that are known for performing the functions specified:
a valve body 1 disposed beneath a vat 2 at an opening through the vat, the body having an internal cavity 8 with three orifices opening into it, namely:
a controlled orifice 5 for putting said vat and said internal cavity 8 into communication via said opening in said vat;
a complementary orifice 6 for putting said internal cavity into communication with an outside space; and
a drive opening 1B;
the valve body constituting a shutter seat 1A around the controlled orifice;
said valve further including:
a shutter member 3 that is movable firstly between an advanced position in which it co-operates with said shutter seat to close said controlled orifice, and secondly a retracted position at a distance from said seat;
a drive part 10 for displacing said shutter member by passing through said drive opening;
drive sealing means 3 for enabling said drive part to move while keeping said drive opening closed; and
drive means 11, 12 disposed outside said valve body for driving said drive part.

According to the present invention, said shutter member and said drive sealing means are constituted by a single deformable membrane 3 having an exposed surface that includes a moving active region 3A that bears against said shutter seat, and an annular peripheral region 3B that surrounds said active region and that is pressed against the margin of said drive opening 1B in such a manner as to close said opening, said exposed surface presenting a bell-shape both in the advanced position and in the retracted position of the shutter member, its bell-shape rising smoothly from said peripheral region to a top of the bell-shape.

The valve includes a cover 4 which is removably fixed to said valve body 1 and which clamps said peripheral region 3B of said deformable membrane 3 against the margin of said drive opening 1B.

The cover 4 contains a mechanism 11, 12 constituting said drive means.

The valve body 1 is generally bell-shaped on a substantially plane annular base 1C which constitutes the margin of said drive opening 1B, said controlled orifice 5 being formed in the vicinity of a top of said bell-shape but being angularly offset from said top so that when the valve body is disposed to place said controlled orifice at the top of said internal cavity 8, and when said controlled orifice is closed by said active region 3A of said membrane 3, an annular intermediate region 3C of said membrane constitutes a sloping floor for said internal cavity 8 around said active region 3A, said additional orifice 6 being formed in said body in contact with the lowest point of said floor so as to ensure that said internal cavity can be emptied under gravity.

The active region 3A of said deformable membrane is in the form of a bell-shaped body projecting into said internal cavity 8 of the valve body 1, said region containing a rigid insert 9 which is driven by said drive part 10 and which imposes said shape on said membrane.

The valve body 1 may also form an auxiliary orifice 7 enabling a fluid to flow permanently between said auxiliary orifice 7 and said internal cavity 8 of said body, separate from said complementary orifice 6.

The valves shown are described below in greater detail to add to the above description, beginning with the valve shown in FIG. 1.

The valve is constituted by a body 1 placed on the margin of an opening formed through the bottom of a vat 2, by a membrane 3 surrounding an insert 9, and by a cover 4 fixed to the body 1 by four bolts (not shown).

The body 1 has a vertical axis control orifice 5 in communication with the vat and a complementary orifice 6 belonging to an emptying duct.

The main axis of the body is sloping so as to make it possible to empty the inside of the body completely when the valve is closed.

The auxiliary orifice 7 connected to the emptying duct may open out into the annular cavity 8. It makes it possible to inject steam or other sterilizing substance on a permanent basis around the sealing region in order to prevent any contamination making its way back up from the duct 6.

The membrane 3 is constituted by an elastomer molded over a rigid insert 9. The insert is fastened to a drive rod 10. The elastomer of the membrane may be covered with a protective film constituted by a chemically inert plastic, thereby increasing the chemical resistance of the valve. The membrane serves both as a shutter member for cutting off flow between the orifice 5 and orifice 6 of the emptying duct, and as sealing means for isolating the fluid flowing inside the valve from the cover 4 and from the control mechanism carried by the cover 4. This mechanism drives the drive rod 10 in axial displacement. It may be constituted by a control wheel 11 (see FIG. 1) or by a pneumatic or an electric motor (see FIG. 3).

Figure 3:
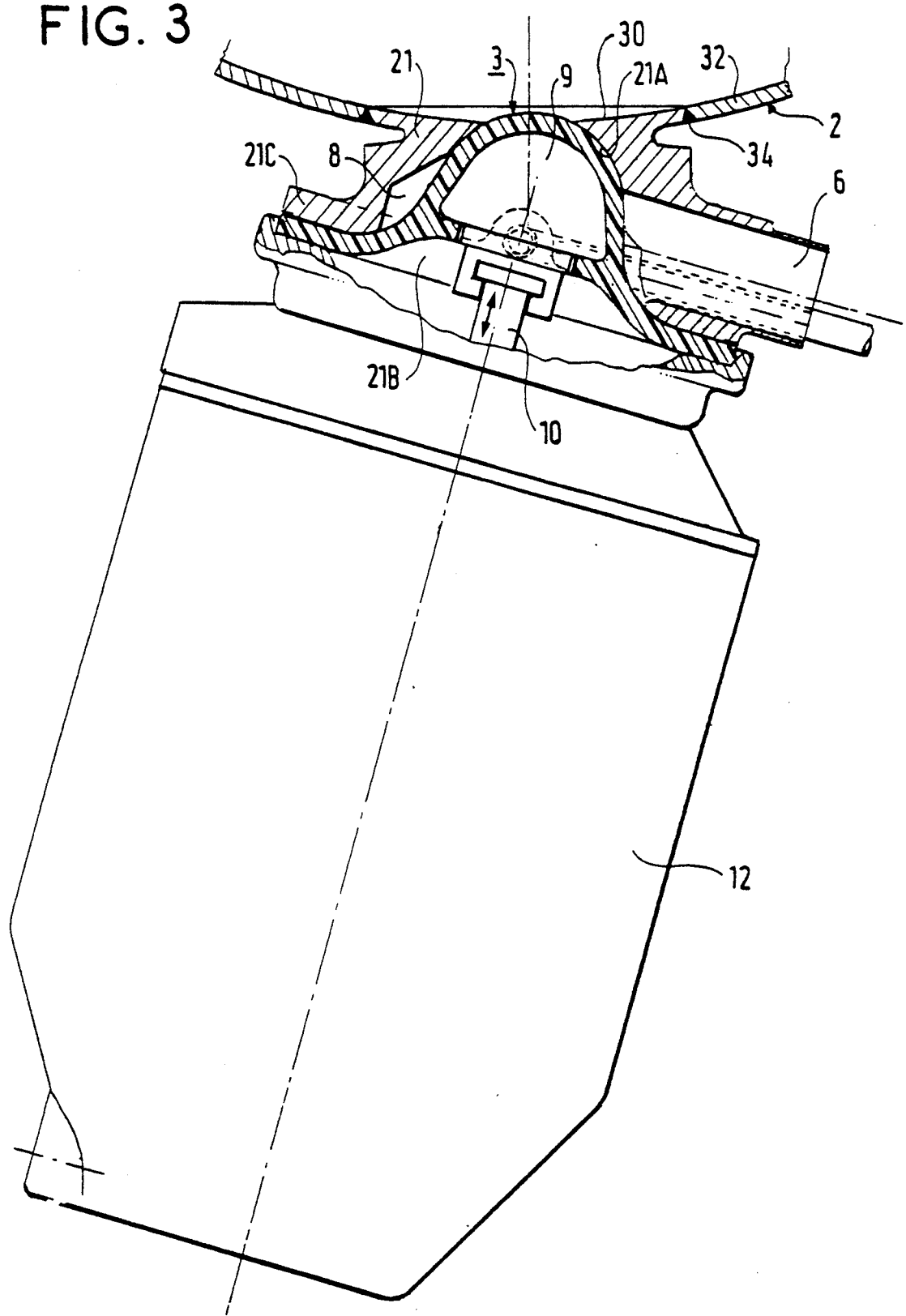
FIG. 3 is an axial section view through a second valve of the present invention.

The second valve shown in FIG. 3 is analogous to the first valve shown in FIG. 1 except firstly with respect to the drive mechanisms 11 and 12 as mentioned above, and secondly with respect to the following points:

The first valve is used in a mixing vat including a stirring blade that acts as a scraper. The unmixed volume is then insignificant since the membrane 3 comes flush with the bottom of the vat (FIG. 1).

In contrast, in a mixer vat that includes a stirring blade that does not scrape the bottom, the second valve is used which has a membrane that projects slightly into the vat. Liquid retention is then zero (FIG. 3).

The body 1 of the first valve is then replaced by a slightly different body 21 forming a seat 21A, and a drive opening 21B, and having an annular base 21C.

The invention makes it possible to obtain the following advantages:

no difficult-to-clean and difficult-to-sterilize gaskets, grooves, guide means, or threads in contact with the fluid;

only two parts are in contact with the fluid;

because the axis of the valve is sloping, the internal cavity of its body is emptied completely;

the body does not include any wear regions and it may therefore be welded to the vat; the valve is easily overhauled by removing its cover and changing the membrane; and the valve is compact, and this is appreciable for a valve that is mounted beneath a vat.

Advantageously, the following disposition is also used: the valve body 1 has a top wall 30 disposed to be integrated in a bottom wall 32 of said vat 2 by being welded thereto, said controlled orifice 5 being pierced through said top wall to simultaneously constitute said opening in said vat.

A circular weld fillet 34 shown in FIG. 1 provides the connection between a narrowed rim of the top wall 30 of the valve body and the remainder of the wall 32 of the vat, and this is done so as to provide continuity in the top surfaces of the walls. This disposition has the following advantages:

very low retention volume (FIG. 1) when the membrane must not stand proud of the bottom of the vat (a vat including a stirrer, for example), or no retention volume: (FIG. 3) when its is permissible for the membrane to stand proud of the bottom of the vat; and because the membrane may be found inside the vat when the valve is in its closed position, and should a socover deposit be formed on the bottom of the vat to constitute a socover layer that is sometimes called "cake", it is possible to break this layer by opening the valve, thereby making it possible to empty the vat (cake-breaking effect).

I claim:

1. A bottom-of-vat valve disposed beneath a vat (2) and forming an internal cavity (8) communicating with said valve via a controlled orifice (5), a deformable membrane (3) having a moving active region (3A) for closing said controlled orifice, a valve body (1) disposed beneath said vat (2) at a margin of an opening through the vat, said body partially defining said internal cavity (8) into which three openings open out, said openings constituting:

said controlled orifice (5) putting said vat and said internal cavity into communication via said opening through said vat;

a complementary orifice (6) putting said internal cavity in communication with an outside space; and a drive opening (1B);

said valve body constituting a shutter seat (1A) around said controlled orifice;

said valve further comprising:

a shutter member (3) movable between an advanced position in which said shutter member engages said shutter seat to shut said controlled orifice, and a retracted position at a distance from said seat;

a drive part (10) passing through said drive opening and operatively engaging said shutter member;

drive sealing means (3) for enabling said drive part to move while keeping said drive opening closed;

drive means (11, 12) disposed outside said valve body for driving said drive piece;

said shutter member and said drive sealing means being constituted by said deformable membrane (3) having a moving active region (3A) which presses against said shutter seat, and an annular peripheral region (3B) which surrounds the active region and which presses against the margin of said drive opening (1B) to close said drive opening, said exposed surface presenting, both in the advanced position and in the retracted position of the shutter member, a bell-shape, rising smoothly from said peripheral region to a top of said bell-shape, said valve body (1) being generally bell-shaped on a substantially plane annular base (1C) constituting the margin of said drive opening (1B), said controlled orifice (5) being formed in the vicinity of the top of said bell-shape and being angularly offset relative to said top so that when said valve body is disposed to place said controlled orifice at the top of said internal cavity (8), and when said controlled orifice (5) is closed by said active region (3A) of said membrane (3), an annular intermediate region (3C) of said membrane constitutes a sloping floor defining a portion of said internal cavity (8) around said active region (3A), said complementary orifice (6) being formed within said body in contact with the lowest point of said floor so that said internal cavity (8) empties via the emptying duct under gravity.

2. A valve according to claim 7, wherein said active region (3A) of said deformable membrane is in the form of a bell-shaped body projecting into said internal cavity (8) of said valve body (1), and a rigid insert (9) is positioned within said active region (3A) and is operatively coupled to said drive part (10) to impose said bell-shape on said membrane.

3. A valve according to claim 1, wherein said valve body (1) further comprises an auxiliary orifice (7) opening externally of said valve body and enabling a fluid to flow permanently into said cavity (8) separate from the emptying duct and said complementary orifice (6) such as steam or another sterilizing substance around the sealing region to prevent backup contamination from said complementary orifice (6).

* * * * *